April 16, 1968 A. MACOVSKI 3,378,634

SYSTEM FOR SCANNING COLOR ENCODED FILM WITH A MONOCHROME TELEVISION CAMERA

Filed Oct. 22, 1965 2 Sheets-Sheet 1

INVENTOR.
ALBERT MACOVSKI

BY Samuel Lindenberg

ATTORNEY

INVENTOR.
ALBERT MACOVSKI
BY Samuel Lindenberg
ATTORNEY

United States Patent Office 3,378,634

Patented Apr. 16, 1968

3,378,634

SYSTEM FOR SCANNING COLOR ENCODED FILM WITH A MONOCHROME TELEVISION CAMERA

Albert Macovski, Palo Alto, Calif., assignor to Stanford Research Institute, Menlo, Park, Calif., a corporation of California Filed Oct. 22, 1965, Ser. No. 501,673

14 Claims. (Cl. 178—5.4)

This invention relates to apparatus for enabling a monochrome television camera to scan a color encoded monochrome film for the purpose of producing signals which can be reproduced in color by a color receiver.

In an application by this inventor entitled, "Photography Using Spatial Filtering," which was filed June 24, 1965, and bears Ser. No. 466,547, there was disclosed an arrangement for photographing a scene on monochrome film through a spatial filter whereby the color information in the scene was recorded on the monochrome film. This film could thereafter be illuminated and by employing a spatial mask, the scene may be displayed upon a screen in its natural color.

In another application by this inventor, entitled, "A Monochrome Photography System for Color Television," which bears Ser. No. 466,624 and was filed June 24, 1965, there was described an arrangement for scanning a monochrome negative upon which the scene had been recorded through the spatial filter, in a manner so that electrical signals may be derived which when applied to a color television receiver would reproduce in color the scene which was so photographed. There is also described an arrangement for using a monochrome television camera for generating color television signals by applying a spatial filter of a specific construction to its photosensitive area.

An object of this invention is the provision of an arrangement whereby a monochrome film, upon which a scene has been photographed through a spatial filter may be presented to a television camera in a manner so that the output of the camera will provide signals which may be directly reproduced by a color television receiver, or which may be modulated and transmitted for the purpose of being received and reproduced by the color television receiver.

In accordance with this invention a scene is photographed upon a black and white negative through a spatial filter. The spatial filter is such as to encode the red information in a plurality of parallel lines extending along one direction and the blue information as a plurality of parallel lines superimposed on the first set of parallel lines but extending in another direction. The average transmission of light passing through this transparency is representative of the luminance signal. When collimated light arriving from a point source is projected through the resultant encoded black and white transparency, the Fourier transform, or image of the point source will substantially appear as five dots, a central dot surrounded by four dots, two of which are on either side of an axis extending through the central dot and which is perpendicular to the direction of one of the grids of lines, let us say the red, and two other dots, one on either side of the central dot, these three dots being on an axis which is perpendicular with respect to the direction of the parallel lines of the blue encoded information.

The first two of the aforesaid dots contain the red informaton and the second two of the aforesaid dots contain the blue information. The central or undiffracted dot contains the light representing the average transmission, which is a good approximation to the luminance signal.

In accordance with one embodiment of this invention, a mask is placed in the Fourier transform plane which has openings therethrough to pass light which occurs only at the five dots previously mentioned. Light modulators are placed at each of the apertures of the mask except the central aperture. These light modulators serve to modulate the color signal information so that each color signal can be separated in the output signal of a television camera upon the face plate of which the light passing through the modulators and the central spot passes. Such a camera may be an image dissector. The light modulators may modulate the red and blue information by amplitude modulation with a different frequency, or by encoding them as quadrature phases of the same carrier frequency. The output signals derived from the television camera can then be separated into the signal components required for a color television receiver to reproduce the image recorded in full color.

In place of modulating the spots of light at the location of the Fourier transform, the desired modulation of the red and blue information may be achieved by using two light sources which may have their intensity modulated by any suitable means. With two light sources, the Fourier transform plane contains two images of the type previously discussed. Therefore the mask for separating these images will have one slit for enabling the light from the three aligned spots to pass therethrough at one location, and adjacent thereto a second slit which is perpendicular to the first one to enable the light from the other aligned spots to pass therethrough. This light is then allowed to fall on the image dissector television camera.

It may be desirable to employ a vidicon television camera which is a storage type of camera tube. Encoding using high frequency modulation is not suitable for this type of camera since they integrate the light intensity of each element for an entire frame interval. For this system an arrangement such as was initially described is employed, using the light modulators at the mask. Further, filter material is placed at the mask which may be color gelatin or different polarized material so that the light dots have different light characteristics and are optically separable. At the photosensitive surface of the vidicon face plate a filter is used which is a superposition of two gratings, one vertical and one at an angle of approximately 45°. Each of these gratings contain alternate lines of filter material and transparent material with the filter material in one set of lines being absorbent to the light from two aligned apertures and in the other set of lines being absorbent to light from the remaining two aligned apertures. The Y, R and B signals may be respectively separated from the output of the vidicon camera by respectively using a low pass filter, a bandpass filter and envelope detector for the red signals and a bandpass filter and envelope detector for the blue signals.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figures 1, 2, 3, 4:
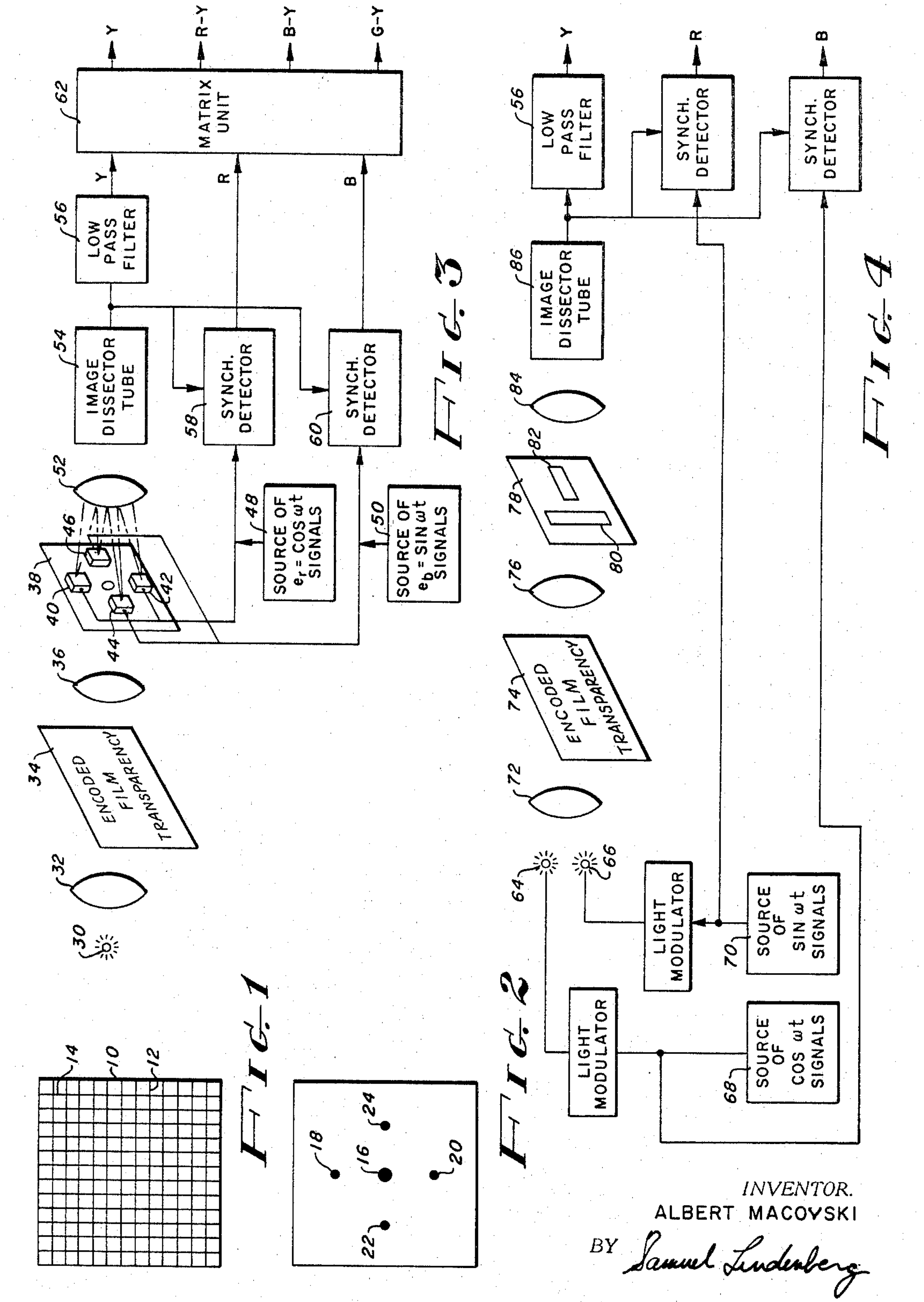
FIGURE 1 represents a spatial filter suitable for use in encoding color information on a black and white or monochrome negative.
FIGURE 2 is a simplified representation of the appearance of the Fourier transform or image of the point source of light which is obtained after it passes through the encoded transparency.
FIGURE 3 is a schematic diagram of an arrangement in accordance with this invention for generating from an encoded black and white transparency, the signals required for a color television system.
FIGURE 4 is a schematic of another arrangement, in accordance with this invention, for generating color television signals from an encoded black and white transparency.

As briefly indicated above, in the application for "Monochrome Photography Systems for Color Television," Ser. No. 466,624, a spatial filter is placed adjacent a monochrome negative in a camera which thereafter is used in the normal way for taking pictures. This may be a still camera or a motion picture camera. The resulting negatives, when developed, contain an encoded picture of the scene which has been taken which has present thereon all the information required for deriving from said monochrome negative color information. FIGURE 1 herein represents a spatial filter 10 of the type which may be employed as described. It contains a grid of horizontal and vertical lines. The horizontal lines 12 are colored one negative primary color such as yellow and the vertical lines 14 are colored a second negative primary color such as cyan. The spaces between the lines are transparent. Since the lines needn't be resolved by the television camera, they need only be resolved by the photograph film. They should be somewhat higher in frequency than the luminance resolution so as not to appear in the reproduced picture. When a picture is taken using this filter adjacent or in contact with the black and white negative, the red information in the scene being photographed will be encoded as vertical lines (the cyan lines blocking out all red information and the red information as a result being recorded in the spaces between the vertical cyan lines). The blue information will be recorded as horizontal lines (the yellow lines blocking out blue information and therefore the blue information will be recorded in the spaces between the yellow lines). The average transmission of light which shines through the film will represent the luminance signal.

When collimated light, which is derived from a point source, is projected through the resultant encoded black and white transparency, the Fourier transform, or image of the point source, will have substantially the appearance as shown in FIGURE 2. This is a central light spot 16 and equally spaced therefrom on either side are light spots 18, 20, each of which contains the blue information. On either side of the central dot 16 are light dots 22, 24, each of which contains all of the red information. It will be noted that the red information light spots are horizontal although the red information was recorded as vertical lines on the transparency. Similarly the blue information light spots are vertically disposed although the blue information was contained on the negative transparency in the horizontal lines. The central or undiffracted spot 16 contains the light representing the average transmission, which in this case is a good approximation to the luminance signal.

The information in the five light spots shown in FIGURE 2 is all that is required for generating color television signals. However, it is necessary that the color information be properly encoded so as to make the various color signals separable when using various television camera devices. An image dissector is a television camera whose output represents the instantaneous intensity of every element in the image during the time it is scanned. When this camera device is used, the color information can be encoded by means of high frequency modulation. This can be either amplitude modulation of two cameras of different frequency, or the information can be encoded as quadrature phases of the same carrier frequency.

FIGURE 3 is a schematic diagram of an arrangement for generating color television signals from an encoded monochrome transparency. A point light source 30 is collimated through a suitable lens 32 and is directed to pass through an encoded film transparency 34. The transparency 34 is encoded by having been used in conjunction with a filter such as the one shown in FIGURE 1. Light passing through the transparency 34 is directed by the lens 36 at the focal point where there is placed a mask 38. The mask 38 is one which has apertures therethrough disposed at the locations of the light spots 18, 20, 22, 24 and 60 which are shown in FIGURE 2. At each one of the mask openings corresponding to the location of the light spots 18, 20, 22 and 24 there are placed the respective light modulators respectively 40, 42, 44 and 46.

These light modulators may be mechanically operated choppers, Kerr cells or any other arrangement which is suitable for modulating light. The light modulators 40, 42 are driven from a source of signals 48 designated as cosine $\omega t$ where $\omega=2\pi$ times the modulating frequency. The light modulators 44, 46 are driven from a source of signals 50, which is designated as sine $\omega t$. Accordingly, the red and blue color information carried by the light passing through the mask are encoded as quadrature phases of the same carrier frequency. The carrier frequency is preferably made high enough to be outside the luminance signal bandwidth, such as greater than 4 megacycles. If it is made low enough to be within the luminance band, it can be rendered invisible using the conventional color television technique of making it an odd multiple of one-half the line frequency, which causes it to be of alternating polarity each time an element is rescanned.

A lens 52 directs the light passing through the light modulators on an image dissector tube 54. This is the conventional television image dissector tube used for generating monochrome signals. In the present application, however, its output is applied to a low pass filter 56 which passes those frequencies containing the Y or luminance color signals. The red or R color signals are derived from the output of the image dissector tube by being applied to a synchronous detector 58 which is driven synchronously from the same source of signals 48 which drives the light modulators 40 and 42. The blue or B electrical signals are derived from the output of the image dissector tube by a synchronous detector 60 which is driven from the same source of signals 50 as drives the light modulators 55, 56. The Y, R and B signals are then applied to the well-known color television matrix unit 62, which is employed in color television, for adding and subtracting these signals to provide as its output the Y, R—Y, B—Y, and G—Y signals which are employed in the conventional color television receiver.

A preferable method of providing the desired modulation of the red and blue information is to modulate two sources and use two masks each allowing either only red or only blue information to pass. An arrangement for performing this is shown in FIGURE 4. Two point light sources 64, 66 which are slightly displaced from one another, are respectively driven by a source of cosine $\omega t$ signals 68 and a source of sine $\omega t$ signals 70. The light from the two sources 64, 66 is collimated by a lens 72 and directed through an encoded film transparency 74. The light which is diffracted by the transparency 74 is directed by the lens 76 at a mask 78 which is located in the focal plane. Each one of the light sources 64, 66 is turned on and off alternately and therefore alternately creates an image at the focal plane 78, which image is of the type shown in FIGURE 2. Each one of these images is displaced from the other to the extent that the two light sources are displaced. Accordingly, if a vertical slot 80 is provided in the mask, it will pass the blue light information together with the luminance information and will reject the red light information. A horizontal slot 82, disposed at the location of the image caused by the second light source will pass only the red information together with the luminance information. A lens 84 directs the light from the respective slots of the mask on the viewing face of an image dissector tube 86. The output of the image dissector tube 86 is connected to an identical circuit arrangement including the low pass filter 56, and synchronous detectors 58 and 60 as are shown in FIGURE 3. These circuits will then provide the requisite Y, R and B signals.

The arrangement just described not only simplifies the structure required at the mask, but also allows for the use of line sources of light that are more efficient than point sources. Thus, any light source can be masked with a vertical slit and can then serve as a vertical line source without causing any cross talk problems. This is also true of a light source which is masked with the horizontal slit mask.

The general method described of using time domain modulation to re-encode color information for an image dissector has the desirable characteristic of not requiring high resolution systems. At no point in the system is it required to resolve the grating lines on the film by the optics or by the camera device. Any defocusing will result in a defocused color picture, but will not result in a loss of color.

For some applications, it would be preferable to encode the information for a storage-type camera tube, such as a vidicon. Encoding using high frequency modulation is completely unsuitable since vidicon tubes integrate the light intensity of each element for an entire frame interval and are thus unaware of any high frequency intensity changes. The separate color can be encoded, however, by placing suitable pieces of filter material on the Fourier transform mask. For example, A type material can be placed on the dots which are horizontally aligned, which represent the red information, and B type material can be placed on the dots which are vertically aligned, representing the blue information. A and B are optically separable filters including two different colors or horizontal and vertical polarization.

Figure 5:
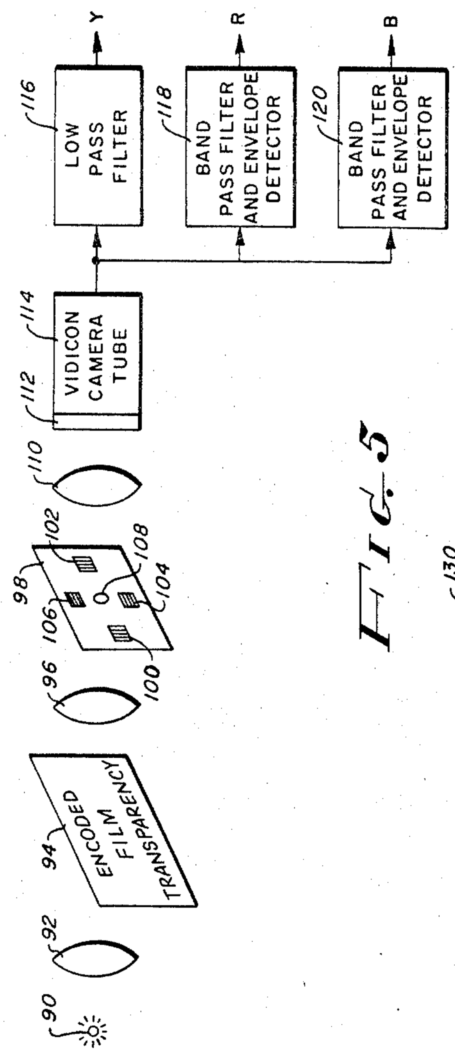
FIGURE 5 shows still another arrangement in accordance with this invention for generating color television signals from a black and white transparency.

Referring now to FIGURE 5 there may be seen a schematic drawing illustrating how the vidicon camera tube may be employed for producing signals usable by a color television receiver. Light from a point light source 90 is collimated by means of a lens 92 and directed through an encoded film transparency 94. The light passing through the transparency is focused by a lens 96 at the Fourier transform plane where there is placed a mask 98. The mask has openings therethrough at locations corresponding to the locations of the light spots shown in FIGURE 2 herein. However, in accordance with the previous description A and B type material are used to cover over these openings. Assume, by way of illustration, that the filter material 100, 102, which covers the horizontally disposed two openings comprises material which colors the light red, which passes therethrough, and the filter material 104, 106, which covers the two vertically disposed openings and colors the light passing therethrough blue. The light which passes through the filter material as well as the uncolored light which passes through the central opening 108 is directed by a lens 110 at a filter 112 which covers the face plate of the vidicon camera tube 114.

Figure 6:
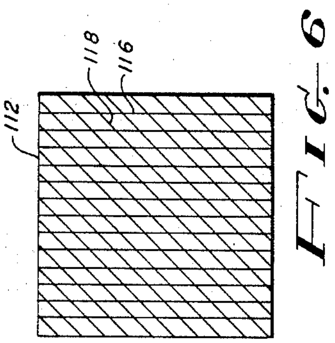
FIGURE 6 shows the details of the filter which is used in FIGURE 5.

The filter 112 is shown in detail in FIGURE 6. It contains a grating of vertical lines 116 over which there is superimposed a grating of diagonal lines 118. The spacing between the lines is transparent. The vertical lines in the filter will absorb light which passes through the filter material covering the horizontally aligned apertures, and the diagonal lines will absorb the light which passes through the filter material covering the vertically aligned apertures. Thus, if the filter material on the horizontally aligned apertures is red, then the vertical lines are colored cyan. Similarly, the diagonal lines will be colored yellow. Thus if colors are used, the grating material of the filter constitutes the complements of those colors, while if polarizations are used, the filter material must be of opposite polarization. With the arrangement shown, the red information modulates a signal at $f_0$ while the blue information modulates a signal as $f_0/\sqrt{2}$. The low frequency output is again the luminance signal.

The high frequency signals can then be envelope detected to provide the desired color signals with a low pass filter providing the luminance signal. Thus as shown in FIGURE 5, the output of the vidicon camera tube is applied to a low pass filter 116, a bandpass filter and envelope detector 118, and a second bandpass filter and envelope detector 120. The pass ranges of these three filters are those which will provide the Y signal at the output of the low pass filter, the R signal at the output of the filter and envelope detector 118 and the B signal at the output of the filter and envelope detector 120. These signals can then be matrixed by a matrix unit similar to those now employed in the color television transmitter. The signal frequencies which enable such separation by these filters are derived as a result of the scanning operation of the vidicon camera tube which scans across the filter 112.

This arrangement has somewhat more stringent resolution requirements than that of the image dissector arrangement shown in FIGURE 3. As before, the optics are never required to resolve the grating with which the color information has been encoded. The vidicon must, however, resolve the grating structure on its photosensitive surface in order to provide color information. To insure that this grating does not appear at a luminance signal output, it must be made to provide a high enough frequency so as not to pass through the luminance low pass filter 116. If the vidicon is to resolve these lines for the color signals, it must be capable of some excess resolution; the amount depending upon the color bandwidth desired. Fortunately, vidicons with resolutions in excess of that required for commercial television standards are available. The advantage of the use of the vidicon as compared to the image dissector, are its increased light sensitivity, thus requiring simpler light sources. In addition, its storage characteristics are desirable for viewing motion pictures since they minimize the requirements for pull down time.

Figure 7:
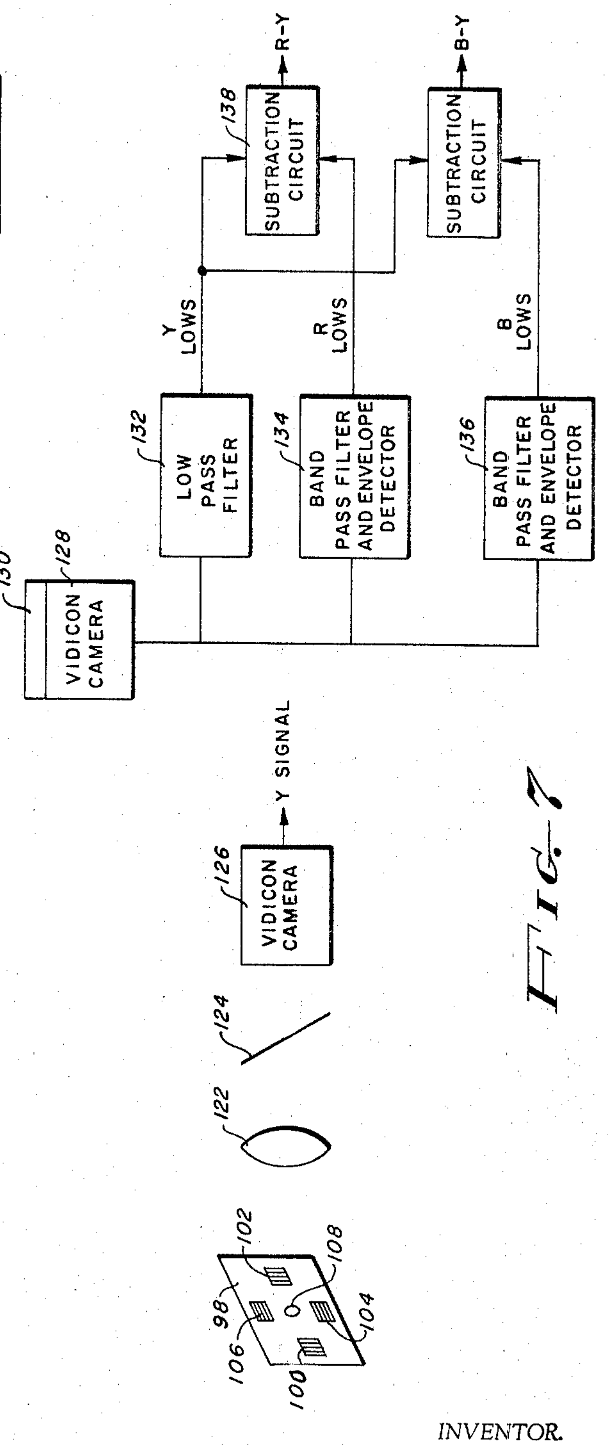
FIGURE 7 illustrates another arrangement in accordance with the techniques illustrated in FIGURE 5 for providing color television signals from a black and white encoded transparency.

To avoid the requirement of excess resolution of the vidicon, a system can be used employing two vidicons viewing the same image in an arrangement as shown in FIGURE 7. Here the mask 98, which has the same filter material 104, 108 and 100, 102, over the openings through which color information passes, are the same as the material described for FIGURE 5. The light which passes through the mask is directed by the lens 122 onto a half silvered mirror 124. A first vidicon camera 126 which is unmodified is used solely for providing the luminance or Y signal. The other vidicon camera 128 has a filter 130 on its face plate which has a similar construction to the filter 112 but is coarser, or does not have as many lines thereon as the filter 112 shown in FIGURE 6. It is made coarser so as to produce frequencies on the order of one to three megacycles. These are readily resolved by the second vidicon and used to create the low frequency color difference signals required by the color television receiver. Thus the output of the vidicon camera 128 is applied to a low pass filter 132, a bandpass filter and envelope detector 134, and a second bandpass filter and envelope detector 136. These respectively provide as outputs the luminance or Y lows, the R lows, and the B low signals. The Y and R low signals are then applied to a subtraction circuit 138 which has as its output R—Y. The Y and B low signals are applied to another circuit 140 to provide as an output the B—Y signals. These signals, together with the wideband luminance or Y signal from the unmodulated vidicon camera 126 provide the requisite signals for a color television camera.

As indicated, the advantage of the last system which has been described, is that no higher resolution cameras are required. The disadvantage is one of registration requirements. It must be emphasized however, that the conventional problems of misregistration, namely, a degraded luminance signal and colored edges does not take place with this arrangement since luminance and chrominance information come from separate cameras. The only misregistration that occurs with the arrangement just described is that between low frequency color information and the corresponding luminance information. Thus the red of lips might be slightly displaced from the mouth as would be the case when the delays are improper. Thus, registration is relatively non-critical since it is not required that the beams within the camera tubes line up within a luminance picture element.

The two vidicon camera systems, using cyan and yellow for the A and B material, can be used as simplified color television cameras for viewing live scenes.

In addition to using encoded monochrome transparencies, to provide color television signals, color transparencies can be used with the encoding filter in contact with them, so as to provide the desired density variations.

There has accordingly been described and shown herein a novel, useful and unique arrangement whereby a monochrome transparency which has recorded a scene through a spatial filter can be employed with black and white television cameras to produce color television receiver signals.

The high frequency components in the luminance and color channels can overlap into each other causing undesirable cross talk. These components can be minimized by reducing high frequency detail in the optics itself such as by defocussing. This would be applied to the camera containing the colored grating filter on its faceplate.

An image orthicon type camera can be used in place of the vidicon camera.

What is claimed is:

1. A system for generating electrical signals required for a color television receiver to reproduce in color an image photographed on a monochrome negative through a spatial filter which comprises two relatively angularly disposed grids of lines each grid of lines being of a different subtractive primary color, said system comprising coherent light means, means for directing light from said coherent light means at one side of said monochrome negative, means for focusing the light which is passed through said negative, means for separating the light passing through said negative into first, second and third light components respectively containing information as to first and second primary color components at the luminance of the image photographed on said negative, television camera means, means for directing said first, second and third light components at said camera means, and means for deriving from the output of said television camera means electrical signals representative of the luminance and primary color information in said image photographed on said negative.

2. A system as recited in claim 1 wherein the means for separating the light passing through said negative into first, second and third light components includes means for focusing the light passing through said negative at a predetermined location, apertured mask means positioned at said predetermined location and having apertures therein positioned for passing only said first, second and third light components.

3. A system as recited in claim 2 wherein the apertures in said apertured mask include a central aperture, a first pair of apertures equally disposed on either side of said central aperture along a first axis passing through the center of said central aperture, a second pair of apertures equally disposed on either side of said central aperture along a second axis passing through the center of said central aperture, the first and second axis respectively being orthogonal with respect to the respective angularly disposed lines recorded on the monochrome negative due to the angularly disposed lines of the spatial filter.

4. A system as recited in claim 3 wherein there is provided a first light modulating means at said first pair of apertures, a second light modulating means at said second pair of apertures, and said television camera means comprises an image dissector tube.

5. A system as recited in claim 3 wherein there is provided a first light modifying means at said first pair of apertures, a second light modifying means at said second pair of apertures, said television camera means comprises a vidicon camera tube, and filter means are positioned adjacent the face plate of said tube for interposing respective first and second line gratings respectively in the path of the first and second modified light components directly on the face plate of said camera tube whereby said camera tube output will contain color representable signals required for operating a color television receiver.

6. A system as recited in claim 3 wherein there is provided a first light modifying means at said first pair of apertures, a second light modifying means at said second pair of apertures, said television camera means comprises a first and a second vidicon camera tube, said means for directing said first, second and third light components at said television camera means includes light beam splitting means for directing all said light components at the face plates of said first and second vidicon cameras, and filter means are positioned adjacent the face plate of said first camera tube for interposing first and second line gratings respectively in the path of the first and second modified light components directed at said face plate whereby the outputs of said first and second camera tubes will contain color representative signals required for operating a color television receiver.

7. A system as recited in claim 1 wherein said coherent light means comprises a first and second source of coherent light disposed adjacent one another, said means for separating the light from said negative into first, second and third light components comprises first and second means for respectively modulating said first and second sources of coherent light, means for focusing the light passing through said negative at a predetermined plane, apertured mask means positioned at said predetermined plane, said apertured mask means having a first elongated aperture positioned for passing therethrough first and third light components, and a second elongated aperture for passing therethrough second and third light components.

8. A system for generating electrical signals required for a color television receiver to reproduce in color an image photographed on a monochrome negative through a spatial filter which comprises two relatively angularly disposed grids of lines each grid of lines being of a different subtractive primary color, said system comprising coherent light means, means for directing light from said coherent light means at one side of said monochrome negative, means for focusing the light which is passed through said negative at a predetermined location, apertured mask means positioned at said predetermined location for separating the light passing therethrough into first, second and third light components respectively representing first and second primary color components and the luminance of the image focused on said negative, first means at said mask for modulating the first light component passing therethrough, second means at said mask for modulating the second light component passing therethrough, a television camera tube, means for directing the first and second modulated light components and said third light component at said television camera tube, and means for deriving the signals required for a color television receiver from the output of said television camera tube.

9. Apparatus as recited in claim 8 wherein said television camera tube is an image dissector tube, and said means for deriving color television signals from the output of said image dissector tube comprises low pass filter means to which the output of said image dissector tube is applied for deriving luminance signal information therefrom, first detector means to which the output of said image dissector tube is applied for deriving electrical signals characteristic of one primary color component required for said color television receiver, and second detector means to which the output of said image dissector tube is applied for deriving therefrom electrical signals representative of a second primary color characteristic required by a color television receiver.

10. A system for generating electrical signals required for a color television receiver to reproduce in color an image photographed and encoded on a monochrome negative through a spatial filter comprising a first source of coherent light, a second source of coherent light positioned adjacent said first source, first means for modulating said first source of coherent light, second means for modulating said second source of coherent light, means for directing light from said first and second sources at said monochrome negative, means for focusing the light passing through said negative at a predetermined plane, mask means positioned at said predetermined plane having a first rectangular slot therein for passing therethrough a first and third light component respectively containing first primary color information and luminance information of the image photographed on said negative and having a second rectangular slot orthogonal to the first rectangular slot for passing therethrough a second light component containing second primary color information, and said third light component, an image dissector television camera, means for directing the light passing through said first and second slot apertures at said television camera, low pass filter means coupled to the output of said television camera for deriving an electrical signal output therefrom representative of the luminance of the image photographed on said negative, a first detector synchronously operated with said first means for modulating for detecting from the output of said television camera electrical signal representative of said first primary color information, and a second detector synchronously operated with said second means for modulating for detecting from the output of said television camera electrical signals representative of said second primary color information.

11. Apparatus as recited in claim 10 wherein said first and second light sources constitute line sources of light which are disposed orthogonally relative to one another.

12. A system for generating electrical signals required for a color television receiver to reproduce in color an image photographed and encoded on a monochrome negative through a spatial filter which comprises two relatively angularly disposed grids of lines each grid being of a different subtractive color, said system comprising a coherent source of light, means for directing light from said source at said negative, means for focusing light passing through said negative at a predetermined plane, a mask positioned at said predetermined plane, said mask having a central aperture, a first pair of apertures each one of said pair being disposed on either side of said central aperture and all being aligned, said first pair of apertures being aligned in orthogonal relationship to the direction of one of said grids of lines recorded on said negative, a second pair of apertures each of which is disposed on either side of said central aperture in said mask and all being aligned, said second pair of apertures being aligned in orthogonal relationship to the direction of the second grid of lines recorded on said negative, means for covering said first pair of apertures with a first material which provides a first distinguishing modification to the light passing therethrough, means for covering said second pair of apertures with a second material which provides a second distinguishing characteristic to the light passing therethrough, vidicon camera means, a mask covering the face of said vidicon camera means, said mask having a first grid of lines thereover each of which has the property of rejecting light having said first distinguishing modification, a second grid of lines on said mask superimposed upon said first grid of lines the direction of said second grid of lines being diagonal to said first grid of lines, each of said second grid of lines having the property of rejecting light having said second distinguishing modification, means for directing the light passing through the central opening in said mask and the light passing through said first material and second material at said filter positioned on the face of said vidicon camera means, and means for deriving from the output of said vidicon camera means electrical signals required for operating a color television receiver.

13. Apparatus as recited in claim 12 wherein said means for deriving from the output of said vidicon camera means signals required for operating a color television receiver include low pass filter means for deriving an electrical signal corresponding to the luminance of the image photographed on said negative, first band pass filter and envelope detector means for deriving a signal corresponding to the red color information in the image photographed on said negative, and second band pass filter and envelope detector means for deriving a signal corresponding to the blue color information in the image photographed on said negative.

14. A system as recited in claim 12 wherein said vidicon camera means comprises a first vidicon camera having said mask on the face thereof and a second vidicon camera, said means for directing the light passing through the central opening of said mask and the light passing through said first material and second material at said camera means comprises means for directing said light both at said mask and at said second vidicon camera, and said means for deriving from the output of said camera means electrical signals required for operating a color television receiver includes means for deriving from the output of said second vidicon camera an electrical signal representative of the luminance of the image photographed on said negative, and means for deriving from the output of said second vidicon camera electrical signals representative of the primary colors in said image photographed on said negative.

No references cited.

ROBERT L. GRIFFIN, *Primary Examiner.*

R. MURRAY, *Assistant Examiner.*